3,669,815
STRUCTURAL LIGHT-WEIGHT PANEL FOR CRYOGENIC AND ELEVATED TEMPERATURE APPLICATIONS
Ramesh R. Desai, Teaneck, and George D. Dohn, Park Ridge, N.J., assignors to Balsa Development Corporation, Northvale, N.J.
Filed Feb. 10, 1971, Ser. No. 114,201
Int. Cl. B32b 2/14; B65d 25/18
U.S. Cl. 161—37
9 Claims

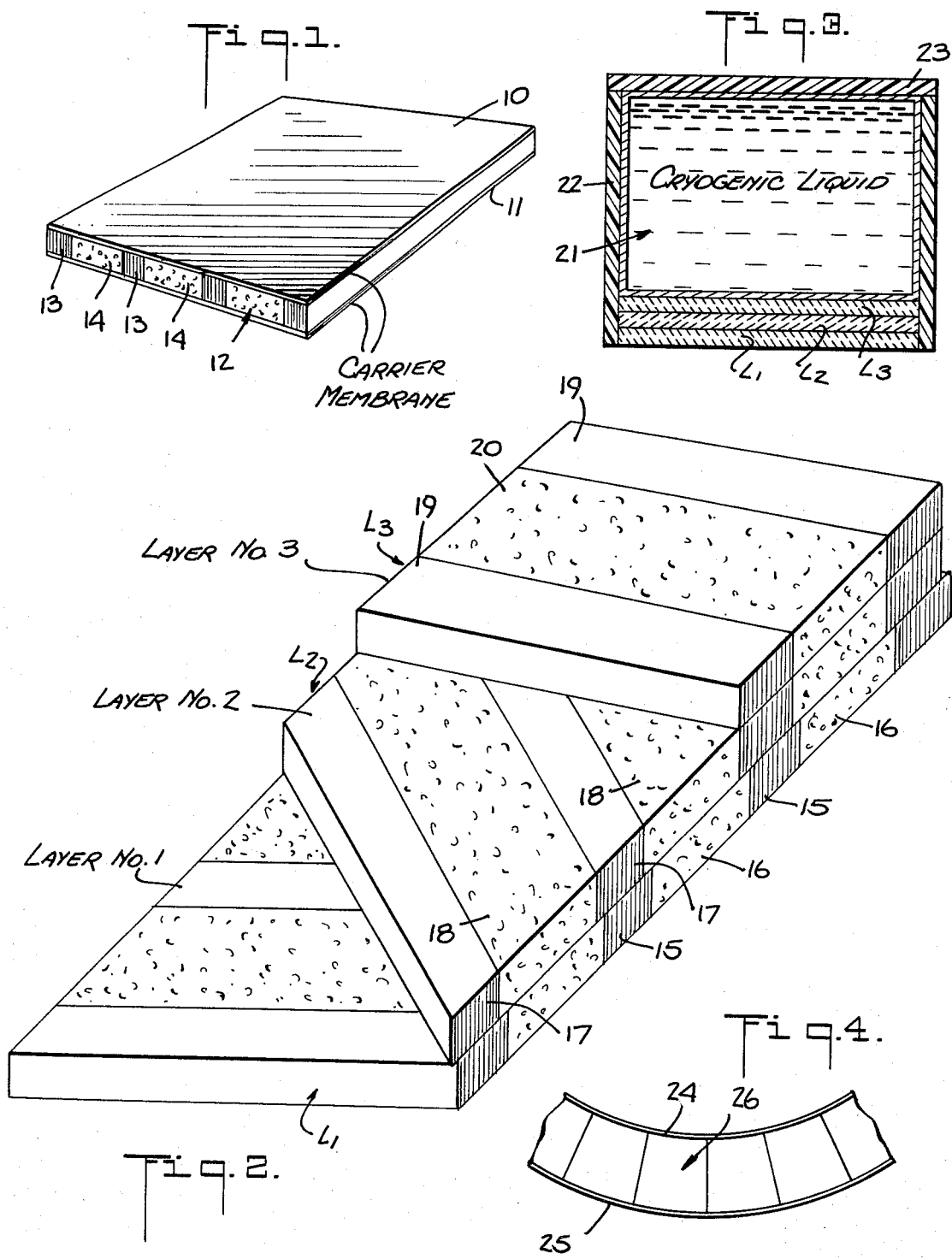

ABSTRACT OF THE DISCLOSURE

A structural light-weight panel of high strength, having thermal insulation properties that render the panel particularly suitable for cryogenic and elevated temperature applications. The panel is constituted by a composite core bonded to a carrier membrane or laminated to facing skins, the core including at least one layer formed by a series of balsa beams in spaced parallel relation, the spacing between the beams being filled with slabs of foam plastic material whose K-factor is similar to that of balsa, whereby the overall thermal insulating characteristics of the composite core are effectively equivalent to that of a homogeneous core composed entirely of foam plastic material, whereas the structural characteristics of the composite core are far superior thereto.

BACKGROUND OF THE INVENTION

This invention relates generally to thermal insulation for cryogenic and elevated temperature applications, and more particularly to high-strength structural panels and sandwich laminates which afford thermal insulation.

Cryogenics, which deals with the phenomena of extreme cold, is assuming considerable commercial significance. In recent years, for example, liquid gases having low boiling points, such as nitrogen and air, have been widely used to freeze perishables which are then protectively stored in insulated containers for prolonged periods without spoilage, or are transported by railroad, truck or vessel over long distances without the need for mechanical refrigeration.

It is also the current practice to liquefy natural gas or methane and to transport the gas in the liquid state in thermally-insulated tanks. The fact that natural gas in liquefied form occupies a volume which is only one six-hundredth of the fuel in the gaseous state, renders the liquefaction process economically feasible even when the liquid must be transported for thousands of miles from the oil well, where it is available as a by-product, to the consumer market. To this end, ocean-going vessels have been specifically fitted to carry cargoes of liquefied natural gas.

The primary concern of the present invention is with containers intended for cryogenic purposes, wherein the load, which may be in liquid or solid form, is at an extremely low temperature and must therefore be thermally insulated from ambient temperature. By "ambient temperature" is meant the temperature of the ambient air or water to which the loaded container is exposed in storage or transit. By "cryogenic container" is meant any form of thermally-insulated, low-temperature enclosure, such as a crate or box intended for rail transportation, a thermally-insulated trailer truck, or an insulated tank to be installed on a barge, a vessel, or placed on the ground.

In all forms of cryogenic containers, the structural and thermal problems are similar, for the container must be of sufficient structural strength to support the load under the most severe conditions encountered in practice, and yet the insulations must be such as to maintain the low temperature of the load within the proper limits despite wide variations in ambient temperature. Moreover, the thermally-insulated structure must be capable of withstanding the stresses produced by the wide temperature differential between the cryogenic load temperature and ambient temperature.

The extremes of temperature to which the cryogenic container is subjected will be appreciated when it is realized that cold liquid hydrocarbons at atmospheric pressure have a temperature in the order of −265° F. whereas ambient temperature may range between 0° F. and +115° F. In the case of liquid nitrogen or liquid helium, the cryogenic temperature is even lower.

In the prior patents to Kohn et al. 3,325,037 and Lippay 3,298,892, there are disclosed structural panels whose core is formed of end-grain balsa wood, the panels having an exceptionally high strength-to-weight ratio as well as excellent thermal insulation properties. Balsa has outstanding properties unique in the lumber field, for it averages less than nine pounds per cubic foot, which is forty percent of the weight of the lightest North American species. The cell structure of balsa affords a combination of high rigidity and compressive and tensile strength, far superior to any composite, matted or synthetic material of equal or higher density. Balsa is dimensionally stable and may be processed by standard woodworking techniques.

The K-factor of balsa is such as to render this material highly suitable as thermal insulation. K-factor is the symbol for thermal conductivity, which is the amount of heat expressed in B.t.u.'s, transmitted in one hour through one square foot of homogeneous material one inch thick, for each degree of Fahrenheit of temperature difference between opposing surfaces of the material.

The K-factor of balsa is comparable to that of urethane foam or other rigid foam plastic material, but there is no basis for comparison as to their structural properties, for foam materials are incapable of supporting substantial loads. On the other hand, balsa wood is a relatively expensive material, whereas the equivalent amount of rigid foam material providing comparable thermal insulation, is of low cost.

SUMMARY OF THE INVENTION

In view of the foregoing, it is the primary object of this invention to provide improved structural panels which are thermally insulating and are therefore suitable for cryogenic applications or insulation at elevated temperature, the panel incorporating both foam plastic material and balsa wood in a composite core.

More specifically an object of the invention is to provide a structural panel of light weight and high strength, the panel being constituted by a composite core bonded to a carrier membrane or laminated to facing sheets, which composite core is formed by at least one layer of balsa beams in spaced parallel relation, the spacing between the beams being filled with slabs of rigid foam plastic material.

A significant feature of the invention resides in the fact that the overall thermal insulating characteristics of the composite core are effectively equivalent to those of a homogeneous core composed entirely of foam plastic material, whereas the structural properties of the composite core are far superior thereto.

Another advantage of the invention is that the cost of the composite core, which is a major factor in the cost of the panel, because it is made up in large part of foam plastic material, is substantially lower in cost than that of a straightforward balsa core. Also, because the core is composed of distinct beams and slabs, rather than a one-piece body, when the core elements are bonded to flexible facing skins, or to a carrier membrane, it becomes possible to contour the panel to conform to a desired curvature.

Still another object of the invention is to provide a panel formed by a multi-layer core of the above-described type, the parallel elements of each layer being angularly disposed relative to the parallel elements of the other layers whereby leakage paths which exist at the junctions of the elements in each layer are blocked, thereby minimizing convection losses.

Briefly stated, these objects are attained in one preferred embodiment of the invention by a structural panel composed of a composite core bonded to a carrier membrane or sandwiched between and laminated to facing sheets of a material suitable for cryogenic or elevated temperature applications, the composite core comprising three layers in superposed relation, each layer being formed by a series of end-grain balsa beams in parallel relation and an interlaced series of slabs of rigid foam plastic material, the beams and slabs in each layer being mutually displaced by 60 degrees.

OUTLINE OF THE DRAWING

For a better understanding of the invention, as well as other objects and further features thereof, reference is made to the following detailed description to be read in conjunction with the annexed drawing, wherein:

FIG. 1 is a perspective view of a single-layer structural panel in accordance with the invention;

FIG. 2 is a perspective view of a multi-layer structural panel in accordance with the invention, the facing sheets being omitted;

FIG. 3 is a section through a cryogenic container including a multi-layer core panel in accordance with the invention; and FIG. 4 shows, in section, a contoured structural panel in accordance with the invention.

DESCRIPTION OF THE INVENTION

Referring now to FIG. 1 there is shown a simple embodiment of a structural sandwich panel in accordance with the invention. The sandwich panel is constituted by facing sheets 10 and 11 which may be formed of metal, wood, fabric or other suitable rigid, semi-rigid or flexible sheeting material, between which is interposed a core generally designated by numeral 12, the core being bonded to the facing sheets by a suitable adhesive or bonding agent.

Core 12 is composed of a single layer of beams 13 of balsa in spaced parallel relation which alternate with parallel slabs 14 of rigid foam plastic material having a K-factor suitable for cryogenic insulation. Preferably the balsa is in end-grain form. By end-grain balsa is meant that the grain of the balsa is parallel to the load imposed thereon, in which event the balsa has a far higher compressive strength than flat-grain balsa in which the load is perpendicular to the grain. In some applications, however, where the load is not essentially compressive in nature, but subjects the panel to bending stresses, then flat-grain balsa is the more appropriate material.

The foam plastic material may be constituted by polyurethane foam, polyvinyl chloride foam, foam-glass or any other commercially available low cost foam having acceptable thermal properties.

Though balsa is available in weights of approximately six pounds per cubic foot, which is much lighter than other forms of lumber, foam plastics are still lighter. Thus polyurethane foam depending on its density, is available in weights of two or four pounds per cubic foot. The K-factors of balsa and urethane foam are quite comparable. Thus at $-260°$ F., the K-factor of one commercial form of balsa (6 pounds per cu. ft.) is 0.11 while that of urethane foam (2 pounds per cu. ft.) is also 0.11. But denser urethane foam (4 pounds per cu. ft.) has a poor K-factor of 0.15.

Because the ability of foam plastic material to sustain a load becomes greater as its density is increased, it has heretofore been the practice when using foam plastic to support a relatively heavy load, to use a dense plastic such as urethane foam weighing 6 pounds per cubic foot for this purpose. But since the K-factor is poorer for higher densities, the use of high density foam to support a load is at the expense of thermal insulation properties and increases the cost of the support.

This drawback, as will now be explained, is overcome by the present invention, which makes possible a core having excellent structural properties without sacrificing thermal characteristics.

It will be seen in FIG. 1 that the beams of balsa and the slabs of foam plastic forming core 12 are of the same thickness and length, whereas the slabs are substantially broader than the beams, so that foam is the predominant material of the core. Since low density foam is considerably cheaper than balsa, the overall cost of the core is much lower than a core composed entirely of balsa. Moreover, the composite core panel is somewhat lighter than a balsa core panel. On the other hand, since the K-factor of foam is about the same as that of balsa, the overall thermal characteristics of the composite core panel are similar to that of a homogeneous foam core panel.

Because of the exceptional structural characteristics of the end-grain balsa beams, the composite core panel is capable of sustaining heavy cryogenic or elevated temperature loads. Obviously, the strength of the core depends on the ratio of balsa to foam plastic material, the larger the relative amount of balsa the stronger the core. It is also to be borne in mind that the dynamic characteristics of balsa are such that it can withstand vibration and impact, whereas rigid foam plastic materials degrade or disintegrate under such conditions. But in the composite core, since the load is carried by the balsa, degradation of the foam plastic is minimized.

In a structural sandwich laminate, the main function of the core material bonded to the facing sheets or skins is to stabilize and stiffen the skins. The bonded core also converts the skins into a unitary structure of great rigidity so that they deform much less under load conditions than they would unjoined. The material of the facings must be appropriate to the temperatures involved.

In practice, the facings may take the form of an open-mesh, flexible screen of non-stretchable material, such as fiber glass, or it may be made of polyurethane film forming a secondary barrier to cryogenic liquids, or even of paper. The facing sheets may also be made of aluminum or steel sheeting. The adhesive for bonding the core to the facings must be suitable for cryogenic purposes. Epoxies, vinyl phenolics and polyurethane elastomers may be used for this purpose.

The invention does not require the use of facings to form a structural panel, and one may combine the composite core with a single carrier membrane or scrim serving merely to hold the core elements together.

In the core arrangement shown in FIG. 1, the junctions between balsa beams 13 and foam plastic slabs 14 (unless these junctions are bonded to each other), represent a possible leakage path resulting in convection losses. To avoid the possibility of such losses as well as to provide a strengthened cross-beam core, multi-layer arrangements may be created in which the beams and slabs of each layer are angularly displaced relative to those of the other layers, thereby blocking the junction paths.

Thus as shown in FIG. 2, a three-layer core is shown in which the first layer $L_1$ is composed of balsa beams 15, alternating with foam plastic slabs 16, the second layer $L_2$ being similarly composed of balsa beams 17 and foam plastic slabs 18 and the third layer $L_3$ of balsa beams 19 and plastic slabs 20. However, the beams and slabs of layer $L_3$ are displaced 60 degrees with respect to those of layer $L_2$ whose beams and slabs are displaced 60 degrees relative to those of layer $L_1$. It will be obvious, however, that in practice a core may be composed of only two layers, or more than three, depending on the desired core dimensions.

In the cryogenic container shown in FIG. 3, the cryogenic liquid is stored in a tank 21, which may be fabricated of metal or plastic material capable of withstanding the low temperatures involved. To thermally insulate the tank, it is placed on a pad formed by a structural panel having a core of three composite layers $L_1$, $L_2$ and $L_3$ of the type shown in FIG. 2. The structural panel, because of the composite core arrangement is capable of sustaining a heavy load.

The tank is surrounded by a thermal insulating jacket 22, which may be formed of foam plastic material but is preferably constituted by a contour-core blanket formed of balsa blocks of the type disclosed in Pat. 3,540,967, Shook et al. The upper end of the tank is covered by an insulating liner 23.

Because the core is composed of planks and slabs rather than of one-piece material, it lends itself to contouring when used in conjunction with flexible facing sheets. Thus as shown in FIG. 4, the panel is composed of flexible facing sheets 24 and 25 between which is sandwiched a composite core 26 formed by alternate beams of balsa and slabs of foamed plastic material, which beams and slabs have a trapezoidal cross section making it possible to contour the panel without creating spaces between the core elements.

While there has been shown and described a preferred embodiment of our invention, it will be appreciated that many changes and modifications may be made therein without, however, departing from the essential spirit thereof. Also, while the panel has been described in conjunction with liquid cryogenic loads, it is not limited thereto and may be used, for example, in insulated containers for frozen perishables or for application where the temperature of the load is higher than ambient temperature, such as in chemical processing tanks.

We claim:
1. A light-weight, high-strength structural panel suitable for cryogenic or elevated temperature applications, said panel comprisnig:
   a core having at least one layer formed by a series of balsa beams in spaced parallel relation and a series of slabs of rigid, relatively low-density foam plastic material disposed in the spacings between the beams, the K-thermal insulation factor of said slabs being similar to that of said beams, and at least one facing sheet bonded to the upper or lower face of said core, said beams and slabs having the same thickness and length, but said slabs being broader than said beams to provide a low-cost core whose predominant material is plastic, but whose structural strength is derived from said beams.

2. A panel as setl forth in claim 1, further including a facing sheet bonded to the other face of the core.

3. A light-weight, high-strength structural panel suitable for cryogenic or elevated temperature applications, said panel comprising:
   a core having a plurality of superposed layers, each being formed by a series of balsa beams in spaced relation and a series of slabs of rigid, relatively low-density foam plastic material disposed in the spacings between the beams, the K-thermal insulation factor of said slabs being similar to that of said beams, and at least one facing sheet bonded to the upper or lower face of said core, said beams and slabs lying in parallel relation and having the same thickness and length, said slabs being broader than said beams to provide a low-cost core whose predominant material is plastic, but whose structural strength is derived from said beams, the beams and slabs of each layer being displaced relative to those of the other layers to block thermal leakage through junctions between the beams and slabs.

4. A panel as set forth in claim 1, wherein said foam material is polyurethane.

5. A panel as set forth in claim 2, wherein said facing sheets are formed of aluminum.

6. A panel as set forth in claim 1, wherein said core is composed of a plurality of supporting layers, the beams and slabs of each layer being displaced relative to those of the other layers.

7. A panel as set forth in claim 3, wherein three layers are provided, the layers being mutually displaced by 60 degrees.

8. A container for a cryogenic liquid, including a tank for storing said liquid, said tank being mounted on a panel as set forth in claim 1.

9. A container as set forth in claim 8, further including an insulating jacket surrounding the tank and formed of the same core material.

References Cited
UNITED STATES PATENTS

| | | | |
|---|---|---|---|
| 3,099,362 | 7/1963 | Schlumberger | 220—9 LG |
| 3,261,087 | 7/1966 | Schlumberger | 220—9 LG |
| 3,325,037 | 6/1967 | Kohn et al. | 161—36 X |
| 2,376,653 | 5/1945 | Boyer | 161—39 |
| 3,540,967 | 11/1970 | Shook et al. | 161—37 X |
| 1,356,764 | 10/1920 | Henderson | 161—56 |
| 3,437,547 | 4/1969 | Sullivan | 161—37 X |
| 3,411,656 | 11/1968 | Jackson | 114—74 AX |

PHILIP DIER, Primary Examiner

U.S. Cl. X.R.

52—309, 249, 415, 613; 161—39, 56, 159, 190; 220—9